United States Patent
Weisel (10) Patent No.: US 10,667,470 B2
(45) Date of Patent: Jun. 2, 2020

(54) SUPPLY AND/OR COOLING SYSTEM

(71) Applicants: B+M TEXTIL GMBH & CO. KG, Sehmatal-Cranzahl (DE); Niklas Andreas Wilm Weisel, Annaberg-Buchholz (DE)

(72) Inventor: Niklas Andreas Wilm Weisel, Annaberg-Buchholz (DE)

(73) Assignees: B+M Textil GmbH & Co. KG, Sehmatal-Cranzahl (DE); Niklas Andreas Wilm Weisel, Annaberg-Buchholz (DE)

( * ) Notice: Subject to any disclaimer, the term of this patent is extended or adjusted under 35 U.S.C. 154(b) by 246 days.

(21) Appl. No.: 15/541,399

(22) PCT Filed: Jan. 7, 2016

(86) PCT No.: PCT/IB2016/050056
§ 371 (c)(1),
(2) Date: Jul. 3, 2017

(87) PCT Pub. No.: WO2016/110811
PCT Pub. Date: Jul. 14, 2016

(65) Prior Publication Data
US 2017/0339842 A1 Nov. 30, 2017

(30) Foreign Application Priority Data
Jan. 7, 2015 (DE) .................... 20 2015 100 027 U (51) Int. Cl.
*A01G 9/02* (2018.01)
*A01G 7/04* (2006.01)
(Continued)

(52) U.S. Cl.
CPC ............. *A01G 9/025* (2013.01); *A01G 7/045* (2013.01); *A01G 31/02* (2013.01); *F24F 5/0003* (2013.01);
(Continued)

(58) Field of Classification Search
CPC ........ A01G 9/025; A01G 9/024; A01G 9/126; A01G 7/045; A01G 31/02; A01G 31/042;
(Continued)

(56) References Cited

U.S. PATENT DOCUMENTS 4,079,546 A 3/1978 Huang
4,255,897 A * 3/1981 Ruthner ................. A01G 7/045
47/65

(Continued)

FOREIGN PATENT DOCUMENTS

AT 318967 B 11/1974
CN 201682843 U 12/2010
(Continued)

Primary Examiner — Joshua D Huson
(74) Attorney, Agent, or Firm — Laurence A. Greenberg; Werner H. Stemer; Ralph E. Locher (57) ABSTRACT

A supply and/or cooling system contains a supply tube or a supply channel for receiving a liquid and/or a gas, which is coupled to a liquid supply device and/or a gas supply and/or gas suction system and has at least one liquid and/or gas discharge opening in a tube, and a channel base or casing region. A strand-shaped ingredient carrier and/or cooling strand is suspended on the supply tube or the supply channel and/or the supply tube or supply channel coupled to the gas supply and/or a gas suction system is suspended below the at least one ingredient carrier and/or cooling strand. The ingredient carrier contains and/or carries at least one ingredient and the ingredient carrier and/or cooling strand can be supplied with the liquid and/or the gas via the liquid and/or
(Continued)

gas discharge opening. The supply tube or the supply channel is vertically moveable.

21 Claims, 4 Drawing Sheets

(51) Int. Cl.
  *A01G 31/02* (2006.01)
  *F24F 5/00* (2006.01)
(52) U.S. Cl.
  CPC .... *F24F 5/0075* (2013.01); *F24F 2005/0082* (2013.01); *F24F 2221/16* (2013.01); *F24F 2221/17* (2013.01); *Y02P 60/244* (2015.11)
(58) Field of Classification Search
  CPC ...... A01G 31/045; A01G 31/00; A01G 31/04; A01G 2031/006; Y02P 60/244; F24F 5/0003; F24F 5/0075; F24F 2005/0082; F24F 2221/16–17
  See application file for complete search history.

(56) References Cited

U.S. PATENT DOCUMENTS

| | | | | |
|---|---|---|---|---|
| 5,201,141 | A * | 4/1993 | Ahm | A01G 31/02 47/59 R |
| 5,363,594 | A * | 11/1994 | Davis | A01G 9/022 47/82 |
| 6,598,339 | B1 * | 7/2003 | Bish | A01G 31/06 47/59 R |
| 6,928,772 | B2 * | 8/2005 | Bai | A01G 9/126 47/62 R |
| 2006/0162252 | A1 * | 7/2006 | Lim | A01G 31/045 47/59 R |
| 2008/0072488 | A1 * | 3/2008 | Fujita | A01C 1/044 47/56 |
| 2009/0156406 | A1 * | 6/2009 | Dujardin | A01G 13/0275 504/360 |
| 2010/0229463 | A1 * | 9/2010 | DeBruin | A01G 9/126 47/46 |
| 2013/0067814 | A1 * | 3/2013 | Riley | A01G 31/02 47/62 R |
| 2014/0109473 | A1 * | 4/2014 | Sung | A01G 9/025 47/39 |
| 2014/0165468 | A1 * | 6/2014 | Roeser | A01G 9/12 47/62 R |
| 2015/0223418 | A1 * | 8/2015 | Collins | A01G 31/02 47/62 R |
| 2015/0289452 | A1 * | 10/2015 | Axley | F28C 3/06 47/66.6 |
| 2015/0334930 | A1 * | 11/2015 | Stoltzfus | A01G 31/06 47/62 A |

FOREIGN PATENT DOCUMENTS

| | | | |
|---|---|---|---|
| CN | 203080760 U | 7/2013 | |
| CN | 103250583 A | 8/2013 | |
| DE | 3804356 A1 | 6/1988 | |
| DE | 3804356 A1 * | 6/1988 | ............ A01G 9/025 |
| DE | 3910287 A1 | 10/1990 | |
| DE | 20008064 U1 | 8/2000 | |
| DE | 202009014675 U1 | 5/2010 | |
| DE | 102010045666 B4 | 5/2012 | |
| DE | 202012104884 U1 | 4/2013 | |
| EP | 0610137 B1 * | 12/1997 | ........... A01G 31/045 |
| FR | 2982732 A1 | 5/2013 | |
| JP | 2006000036 A | 1/2006 | |
| JP | 2009017800 A | 1/2009 | |
| JP | 2009225676 A | 10/2009 | |
| RU | 138445 U1 | 3/2014 | |

* cited by examiner

SUPPLY AND/OR COOLING SYSTEM

BACKGROUND OF THE INVENTION

Field of the Invention

The present invention relates to a supply and/or cooling system which comprises at least one supply tube or a supply channel for receiving a liquid and/or a gas, which is coupled to a liquid supply device and/or a gas supply and/or gas suction system and comprises at least one liquid and/or gas discharge opening in a tube or channel base or casing region, wherein at least one strand-shaped ingredient carrier and/or cooling strand is suspended on the supply tube or the supply channel and/or the supply tube or supply channel coupled to the gas supply and/or gas suction system is suspended below the at least one ingredient carrier and/or cooling strand, and wherein the ingredient carrier comprises and/or carries at least one ingredient, and the ingredient carrier and/or cooling strand can be supplied with the liquid and/or the gas via the liquid and/or gas discharge opening.

For pollutant reduction, especially for $CO_2$-bonding and for filtering particulate matter, as well as for oxygen production, for noise protection and/or for embellishing urban spaces, there is a trend towards greening the urban spaces, urban infrastructure and buildings. For this purpose, among other things, parks are created, courtyards greened, facades and roofs planted. However, especially the greening of facades and roofs by means of greenery devices present the problem that the greenery device as well as seeds and/or plants provided therein or thereon are difficult to access after the installation on the facades and/or roofs and thus care or maintenance of the seeds and/or plants as well as the greenery systems is usually only possible with great difficulty.

Apart from the greening of urban spaces, the use of specific roof tiles, cobblestones and/or facade paints known from the prior art, which are provided with photo-catalytic material, can contribute to the reduction of pollutants.

The document DE 20 2009 014 675 U1 for example describes a planting plate for facade greening, wherein the planting plate is fixed on the front like a slate shingle. On a plastic plate covered by the planting plate, a substrate carrier is provided, onto which seeds are applied. The substrate carrier serves the purpose of holding roots of plants and water.

The document DE 20 2012 104 884 U1 discloses a vertical greening system which comprises a carrier plate, which is fixed to load-bearing walls. A covering fleece is provided on the carrier plate, which in one embodiment is folded in such a way that it forms pocket-type shapes. A water-storing substrate is brought into these plant pockets, which, along with the fleece, form a rootable medium for plants. In one variant, the vertical greening system has a channel serving as a water guiding profile below the carrier plate. In another embodiment, the water guiding profile can also fully enclose the vertical greening system as a frame.

The document DE 10 2010 045 666 B4 discloses a greening system for greening vertical and tilted surfaces. The greening system uses a vegetation support layer, which is arranged in such a way in front of a watering structure that water and/or nutrients are flowing past the vegetation support layer and a water/nutrient transport is happening between the vegetation support layer and the watering structure. In one embodiment, a covering and retention layer comprising several growth openings can be additionally arranged in front of the vegetation layer, covering it.

SUMMARY OF THE INVENTION

It is the object of the present invention, to provide a supply and/or cooling system, which can be used in a flexible manner, is easily accessible and easy to handle, as well as comprising a simple structural design.

The object of the present invention is solved by a supply and/or cooling system of the above-mentioned type, in which the supply tube or the supply channel can be moved vertically.

The invention provides a supply and/or cooling system, in which one or several ingredient carriers and/or cooling strands suspended on the supply tube or the supply channel can be supplied with the liquid via the supply tube or the supply channel and a therewith coupled liquid supply device.

The supply tube or the supply channel of the supply and/or cooling system according to the invention thus not only serve for holding the ingredient carrier(s) and/or cooling strand suspended on it, but especially also serves the intake and forwarding of the liquid and its supply to the ingredient carrier(s) and/or the cooling strand.

A medium liquid or fluid at 20° C. and 1 bar is understood by a liquid. With the present invention, the liquid is a supply liquid for the ingredient carrier(s) and/or the cooling strand(s), especially for the ingredient(s), which the ingredient carrier comprises and/or carries. In the simplest case, the liquid can be water or a nutrient solution, but could also be oil or a gel.

With the supply and/or cooling system according to the invention, the liquid can be led continuously or at intervals into the supply tube or the supply channel by means of the liquid supply device coupled to the supply tube or the supply channel.

The liquid supply device can for example comprise at least one collecting container for taking in and stocking up the liquid as well as at least one supply line for the liquid, leading away from the collecting container to the supply tube or the supply channel. The collecting container can for example be formed as a tank, storage container, reservoir, lake, rain gutter or the like.

As a supply line, a tube or a hose for example leading from the collecting device into the supply tube or the supply channel can be used, wherein the tube or the hose can for example be plugged into the supply tube via at least one opening of the supply tube or can be laid in the supply channel over an edge of the supply channel. Thereby, the liquid can be transported from the collecting container through the supply line to the supply tube or the supply channel by means of pumps, compressed air or negative pressure or can just flow off into the supply tube or the supply channel due to the gravitation.

The liquid supply device can be provided on any position on the supply system or in the surroundings of the supply system, insofar a fluid coupling of the liquid supply device with the supply tube or the supply channel is guaranteed.

The supply tube or the supply channel can be formed in any length and/or any form and/or of any liquid-safe materials. Thus, the supply tube can for example comprise a round or rectangular cross section, whereas the supply channel can for example comprise a semicircular or triangular cross section. Preferably, the supply tube or the supply channel is aligned linearly, however, in specific embodiments of the present invention, it can also be angular or be led across corners in its length expansion or can be formed arch-shaped.

The at least one strand-shaped ingredient carrier and/or cooling strand can for example be formed as a band, cord, rope, string, lanyard and/or chain. It can be made of one piece or can be put together to a strand from individual strand-shaped components. It can furthermore consist of any imaginable materials.

Due to the suspended fixing of the at least one strand-shaped ingredient carrier and/or cooling strand on the supply tube or the supply channel, the liquid striking the at least one strand-shaped ingredient carrier and/or cooling strand, can easily flow or drip into the entire ingredient carrier and thus the entire ingredient carrier can be supplied adequately with the liquid.

According to the invention, the strand-shaped ingredient carrier and/or cooling strand fixed on the supply tube or the supply channel is supplied with the liquid through at least one liquid discharge opening provided in a tube or channel base region. The liquid discharge opening can be formed as a simple drill, as an opening with an integrated sieve or filter, as an opening with lock or valve or as an opening with an outlet pipe or outlet channel fixed thereon.

Providing the liquid discharge opening in the tube or channel base region, preferably in a sink of the supply tube or the supply channel, has the advantage that the liquid can flow or drip from the supply tube or the supply channel directly onto the at least strand-shaped ingredient carrier without the use of additional conveying systems. The liquid discharge from the supply tube or supply channel to the at least one ingredient carrier and/or cooling strand thus practically takes place by itself in the simplest embodiment of the present invention; accordingly, the acquisition and operating costs of the supply and/or cooling system according to the invention can be kept low.

In another embodiment of the invention, the liquid from the supply tube or the supply channel can also be deposited on the at least one ingredient carrier and/or cooling strand by means of a specific discharge system. Thus, for example a system can be provided, which sucks in the liquid from the supply tube or the supply channel and deposits it under pressure on the ingredient carrier and/or the cooling strand. This has the advantage that large quantities of the liquid can be transported faster to the and/or through the at least one ingredient carrier and/or cooling strand.

With the supply and/or cooling system according to the invention, a parallel liquid and gas supply or just a gas supply of the ingredient carrier and/or the cooling strand is also possible. Thereby it has proven to be advantageous, if the liquid supply, following gravity, takes place from above and the gas supply takes place from below, for example with an air/$CO_2$ mixture.

According to the invention, the at least one strand-shaped ingredient carrier comprises at least one ingredient, which can be provided partially on or in the ingredient carrier or can be carried by the ingredient carrier or can cover the ingredient carrier completely or at least partially. Furthermore, the ingredient carrier can consist fully or partially of the ingredient. As an ingredient, for example at least one substrate can be used. The substrate can for example be formed of soil, non-woven fabric, moss, peat or clay granules. Furthermore, a substance for reducing emissions and/or for producing oxygen can be used as an ingredient. Moreover, at least one substance comprising sound-absorbing, air-freshening, decorative and/or other characteristics can be used as ingredient(s).

For efficiently using, caring, equipping, maintaining and/or repairing the at least one ingredient carrier and/or cooling strand, the supply tube or the supply channel and/or the at least one liquid discharge opening, the supply tube or the supply channel can be moved vertically with the present invention. Thus, the supply tube or the supply channel can be provided on a high position during use and can be moved downwards for an easy access to the upper and medium areas of the ingredient carrier(s) or for maintaining the supply tube or the supply channel. The vertical movability of the supply tube or the supply channel thus enables a good usability and maintainability of all sections of the ingredient carrier and/or the cooling strand without much effort.

If the supply and/or cooling system according to the invention comprises cooling strands, the cooling strands can be used for adiabatic cooling processes, such as cooling rooms or inner areas of facilities.

Thereby, the vertical movability of the supply tube or the supply channel can be realized both manually and automatically. The movability can be realized in different steps or stepless. Preferably the supply tube or the supply channel is moveable downwards and afterwards upwards up to a lower end of carriers of the supply system, preferred at least up to half of the height of the supply system, even more preferred up to a third of the height of the supply and/or cooling system.

The at least one ingredient carrier and/or the at least one cooling strand can also be formed transportable or moveable and/or reelable horizontally. Thus, the installation complexity of the supply and/or cooling system can, if necessary, be reduced. In order to be able to realize the horizontal transport, transport systems known from window decoration or the sun protection technology can for example be used. The strands and/or textiles used for forming the at least one ingredient carrier and/or cooling strand can for example be transported horizontally in guide rails by means of hooks and chain conveyor systems and can thereby for example be picked from a roll.

Preferably, the supply tube or the supply channel is coupled and/or can be coupled with an electric, pneumatic, hydraulic and/or manual drive unit for vertically moving the supply tube or the supply channel.

In a preferred embodiment of the supply and/or cooling system according to the invention, the at least one ingredient is provided on or in spaced apart operating positions of the ingredient carrier. By way of the ingredient carrier, its operating positions are connected to each other in strand-shaped fashion and yet are separate from each other. Due to the strand-shaped formation of the ingredient carrier, the liquid is by and by supplied to each operating position by its running down on the ingredient carrier. Hereby, ingredients with differing properties can for example be easily provided on the ingredient carrier, while nevertheless all operating positions are adequately supplied with the liquid.

Preferably, substrates are inserted in the spaced apart operating positions.

For this purpose, the ingredient carrier can for example be formed of a flexible material, into which the substrates can be inserted by stretching the material of the ingredient carrier on the spaced apart operating positions, while the material of the ingredient carrier above and below the respectively inserted substrate is un-stretched and thus keeps the substrate on the stretched position. This means, the substrates are enclosed by the material of the ingredient carrier in their position embedded in the ingredient carrier and are fixed between the un-stretched areas of the ingredient carrier. However, the at least one ingredient carrier can also perform the task of preventing a discharge of the ingredient carried by it due to a decrease in volume during a desired reaction of the ingredient.

However, the ingredient can also comprise spaced apart pockets in which for example substrates are inserted.

According to an optional embodiment of the supply and/or cooling system according to the invention, the supply tube or the supply channel is attached to a vertically immobile holding module of the supply and/or cooling system by means of an extendible fixing system.

With the holding module, the individual elements of the supply and/or cooling system, such as the supply tube or the supply channel or the liquid supply device, can not only be fixed, but especially be held together. Furthermore, the holding module can for example include elements of the liquid supply device. Moreover, the holding module can be fixed on a suitable position, whereby the entire supply and/or cooling system can be kept stable. The extendible fixing system enables an easy vertical movability of the supply tube or the supply channel despite the stationary fixture by the holding module.

The holding module is preferably provided on an upper end of the supply system, wherein the holding module is rotatable within its own axis or can also be movable horizontally and/or removable, whereby the accessibility and thus the maintenance, care and repair of individual components of the supply and/or cooling system can be additionally simplified and improved.

The extendible fixing system can for example be formed as a rope winch, which is fixed to the holding module. Moreover, guide rails can also be provided on the holding module, in which the supply tube or the supply channel can be led and stored.

The drive unit for controlling and regulating the extendible fixing system and thus for vertically moving the supply tube or the supply channel and/or for horizontally moving the at least one ingredient carrier and/or cooling strand can be chosen depending on the space capacity, the possibilities of media supply, the frequency of use of the vertical move ability of the supply tube or the supply channel and/or the economic efficiency. According to the individual circumstances, the drive unit can be integrated into the supply system or can be placed as a separate unit on the supply and/or cooling system. Preferably however, the drive unit is located in close proximity to the extendible fixing system.

The supply and/or cooling system ideally comprises at least one vertical carrier, on which the supply tube or the supply channel is led. The guide of the supply tube or the supply channel in the vertical carrier secures the position and vertical movability of the supply tube or the supply channel especially during the outdoor use of the supply and/or cooling system, where potentially high natural or artificial wind speeds can occur and thus minimizes the risk of damages.

For this purpose, preferably two vertical carriers opposing each other are used, in which one end or one area each is held and guided close to the end of the supply tube or supply channel. However, in some applications only one vertical carrier can be provided, which is for example provided central of the length of the supply tube or the supply channel or holds the supply tube or the supply channel gallows-like, if it or they is/are relatively short.

The at least one vertical carrier can, among others, be formed as a pillar, post, rod or column, can however also be formed by a wall, a masonry or a tree.

Preferably, a frame is provided around the at least one ingredient carrier and/or cooling strand, which is formed at least partially by the holding module and the at least one vertical carrier. For forming the frame, the at least one vertical carrier is preferably connected to the holding module provided on the upper end of the vertical carrier. However, it is also possible to connect the at least one vertical carrier and the holding module by way of a horizontal guide attached to an upper end of the vertical carrier. For connecting, rivet, bolt, screw or welded connections can be used among other things.

The frame increases the stiffness of the supply and/or cooling system. By means of the frame, the supply and/or cooling system according to the invention can therefore also be positioned freely, for example in a room, without having to be fixed on a wall or the like.

In a preferred embodiment of the invention, the supply tube or the supply channel is guided by two vertical carriers arranged double-sided and in longitudinal alignment of the supply tube or the supply channel. By way of these two carriers, a double-sided stabilization of the supply and/or cooling system is caused, wherein the height-adjustable supply tube or supply channel act(s) as intermediate support between the two vertical carriers and thus creates an additional stiffness of the supply system. Furthermore, this embodiment is particularly suitable for forming a frame construction for the supply and/or cooling system.

In a useful embodiment of the invention, the at least one vertical carrier comprises at least one media line for media guidance. The media lines, for example for electricity and/or the liquid, are preferably integrated inside the at least one vertical carrier, can, in other embodiments however, also run along outside on or around the carrier and be fixed there with clamps, specifically intended indentations or the like.

By way of the media line running along on or in the at least one carrier, the respective medium can be easily and safely led to the supply tube or the supply channel or a drive unit provided there by a media source provided spaced apart from the supply tube or the supply channel.

Furthermore, the laying of media lines can be done quickly and easily, especially with hollow carriers and/or carriers, which for example comprise an outer supporting and/or holding device for the at least one media line. Moreover, a media line led on the inside of a vertical carrier that is hollow inside can be well protected from external influences such as rainfall, wind or vandalism.

It is optionally provided that the supply and/or cooling system comprises at least one gas supply and/or gas suction system and/or ventilation system aligned to or alignable to the at least one ingredient carrier and/or cooling strand. Via the gas supply system and/or the ventilation system, air can for example be supplied to the at least one ingredient carrier and/or cooling strand in order to supply fresh oxygen to the operating positions or to free the at least one ingredient carrier and/or cooling strand from dust and/or to accelerate the substance transport or substance and/or energy exchange processes in the at least one ingredient carrier. If a gas suction system is used, product materials and/or harmful substances, for example resulting from a reaction on the operating positions of the ingredient carrier, can be sucked away.

In the process, the gas supply and/or gas suction system can be provided on all imaginable positions of the supply and/or cooling system, such as the holding module and/or the at least one vertical carrier. In order to obtain an ideal efficiency of the gas supply and/or gas suction system, it is merely important that the gas supply and/or gas suction system is fixed on the supply and/or cooling system in such a way, that it is aligned to the at least one ingredient carrier and/or cooling strand and/or ensures the supply current with regard to the respective wind or flow through conditions over the at least one ingredient carrier and/or cooling strand.

The gas supply and/or gas suction system can comprise one or several gas supply and/or gas suction openings, wherein the number, arrangement, size as well as suction and supply pressure of the individual gas supply and/or gas suction openings can be chosen according to individual circumstances.

It is also especially favorable, if the supply and/or cooling system comprises at least one electric illuminating device aligned or alignable to the at least one ingredient carrier and/or cooling strand. The illuminating device yields substantial benefits, especially with regard to processes in or on the ingredient carrier and/or cooling strand, which need light for processing. With the illuminating device, the ingredient carrier and/or cooling strand or its operating positions can be precisely illuminated regardless of daytime and place, in order to be able to make optimal use of the ingredient carrier and/or cooling strand. Furthermore, the illuminating device can also be helpful with a potential care, maintenance or repair of the supply and/or cooling system. The illuminating device can also be a UV illumination serving for disinfection. However, the light might as well be used as a decorative means for staging the supply and/or cooling system.

Depending on the location of the supply system and function of the light, the illuminating unit can be placed on the most diverse positions of the supply and/or cooling system. Depending on the function, the location and/or other parameters, the number of lamps, which the illuminating device comprises, their radiation intensity and/or their illumination time can be varied.

In a preferred embodiment of the invention, the at least one ingredient carrier and/or cooling strand is fixed in or on and/or below the liquid discharge opening of the supply tube or the supply channel.

It is especially preferable, if the ingredient carrier and/or cooling strand is fixed on or in the liquid discharge opening in such a way that it is led through the liquid discharge opening and is held within the supply tube or the supply channel. The ingredient carrier and/or cooling strand can for example be held by means of a knot placed on an upper end of the ingredient carrier and/or cooling strand, which is located inside the supply tube or the supply channel. In other embodiments of the supply and/or cooling system according to the invention, special holding devices, such as hooks, eyelets, or clamping devices, which are provided down below on the supply tube or the supply channel, can also be used for holding the ingredient carrier and/or the cooling strand.

The ingredient carrier and/or cooling strand is respectively to be fixed in or on and/or below the liquid discharge opening that the liquid strikes upon the ingredient carrier and/or the cooling strand. This can happen directly or indirectly, by link mechanisms. Thus, it is possible to provide an additional line on the supply tube or the supply channel, which leads the liquid directly to the ingredient carrier and/or cooling strand, in case it is not fixed directly below, on or in the liquid discharge opening. In that case, the ingredient carrier and/or cooling strand can for example also be arranged on an outer wall of the supply tube or the supply channel next to the liquid discharge opening.

The ingredient carrier and/or cooling strand can also be fixed on an additional rail, rod or the like, which is for example connected to the supply tube or the supply channel by means of ropes or connecting struts.

A close arrangement of the ingredient carrier and/or cooling strand in or on and/or below the liquid discharge opening has proven to be especially advantageous, since the ingredient carrier and/or cooling strand can thereby be ideally supplied with liquid, without the need to provide further additional conveying and/or guidance systems.

However, the installation of the ingredient carrier and/or cooling strand at a certain distance to the liquid discharge opening also yields certain benefits. Thus, there are more liberties when fixing the at least one ingredient carrier and/or cooling strand. Furthermore, several ingredient carriers and/or cooling strands can be more easily supplied with the liquid by means of a liquid discharge opening with such an embodiment. Due to the distance of the ingredient carrier and/or cooling strand to the liquid discharge opening, it is not unnecessarily constricted by the ingredient carrier and/or cooling strand, whereby the liquid can easily flow out of the liquid discharge opening.

In another embodiment of the supply and/or cooling system according to the invention it is provided that a liquid supply line connected to the at least one liquid discharge opening, is led through the at least one ingredient carrier and/or cooling strand. In this embodiment, the liquid supply line can for example be formed as a hose comprising pores, which is enclosed by an ingredient carrier and/or cooling strand formed in rope-like fashion. This variant makes it possible to adequately supply the ingredient carrier and/or cooling strand with the liquid, wherein the liquid supply lines do not destroy the optical appearance of the supply and/or cooling system. Moreover, no complex fastenings for the liquid supply lines need to be provided on the supply and/or cooling system.

Preferably, the liquid supply line is directly connected to the liquid discharge opening so that the liquid can flow out of the supply tube or the supply channel through the liquid discharge opening into the liquid supply line and can be delivered by it to the ingredient carrier and/or cooling strand. Just like the ingredient carrier and/or cooling strand itself, the ingredient carrier and/or cooling strand comprising a liquid supply line can be provided on all imaginable positions of the supply tube or the supply channel. Furthermore, the ingredient carrier and/or cooling strand comprising a liquid supply line can also be fixed in any desired distances to the supply tube or the supply channel. Moreover, there is also the possibility to use the supply tube or the supply channel only for laying the liquid supply line, wherein the liquid supply line is coupled to the liquid supply device.

In a preferable embodiment of the present invention, the liquid supply device and the strand holder for the at least one ingredient carrier are components separately formed from each other. In this separated version, the strand holder contains all means for winding up and unwinding or folding the at least one ingredient carrier and/or cooling strand. Thereby, an easy exchange of the strand module consisting of the strand holder and the ingredient carrier and/or cooling strand, is possible. Thereby, the strand module can be for example formed as an exchangeable holding and winding unit.

In an optional embodiment of the present invention, at least one adjustable valve and/or an adjustable nozzle is provided on the at least one liquid discharge opening. The valve enables a discharge of the liquid at intervals, while the liquid can be deposited targeted and concentrated to the at least one ingredient carrier and/or cooling strand by means of the nozzle. Thereby, an ideal liquid supply of the ingredient carrier and/or cooling strand can be realized with, at the same time, economical liquid consumption by means of the at least one valve or the at least one nozzle. Furthermore, the liquid supply can be adjusted to the respective ingredient carrier and/or cooling strand, its mode of action and requirements as well as different environmental conditions, especially temperature and weather circumstances.

According to another preferred embodiment of the supply and/or cooling system according to the invention, at least one stabilizing element is provided at a vertical distance to the supply tube or the supply channel, on which the at least one ingredient carrier and/or cooling strand is fixed and/or through which the at least one ingredient carrier and/or cooling strand is led.

The stabilizing element can for example formed in shape of a rod or a tube. For holding the stabilizing element, the ingredient carrier and/or the cooling strand can either be wound around the stabilizing element or fixating it by entwining and tethering up.

Furthermore, the stabilizing element can comprise openings through which the at least one ingredient carrier and/or cooling strand is led. In such an opening, the stabilizing element can thereby comprise either a clamp-like holder for fixating on the ingredient carrier and/or cooling strand. It is also possible that the ingredient carrier and/or cooling strand comprises a thickening or an attached holder, which is larger than the opening of the stabilizing element, whereby the ingredient carrier and/or cooling strand is prevented from slipping through.

It is also possible to provide at least one hook or at least one other fastening element on the stabilizing element on which the at least one ingredient carrier and/or cooling strand can be fixed on the stabilizing element.

The stabilizing element can be attached on a lower end of the suspended thread-shaped ingredient carrier and/or cooling strand or on another suitable position of the ingredient carrier and/or cooling strand. Several spaced apart stabilizing elements can also be provided on the ingredient carrier and/or cooling strand.

The stabilizing element primarily serves the purpose of receiving flow energy which is transferred from the environment to the supply and/or cooling system, especially to the at least one ingredient carrier and/or cooling strand. Especially if the supply and/or cooling system is exposed to the weather, the wind resistance of the supply and/or cooling system can be increased by using the stabilizing element, whereby damages of the supply and/or cooling system, especially of the at least one ingredient carrier and/or cooling strand, can be minimized. Weighing down the at least one ingredient carrier and/or cooling strand by means of the stabilizing element, largely fixates the ingredient carrier and/or cooling strand in its suspended position and especially prevents a tangling of ingredient carriers and/or cooling strands hanging side by side.

It is especially favourable, if at least two ingredient carriers and/or cooling strands are connected to each other through the stabilizing element. The connection of the at least two ingredient carriers and/or cooling strands through the at least one stabilizing element increases the mechanical stability of the supply and/or cooling system and counteracts a tangling of the ingredient carriers and/or cooling strands.

The stabilizing element is preferably formed as a rod or tube and is arranged parallel to and spaced apart from the supply tube or the supply channel. Thereby, the at least two ingredient carriers and/or cooling strands suspended parallely on the supply tube or the supply channel can for example respectively be fixed with their freely suspended thread ends on the rod or tube shaped stabilizing element or can be led through it. Due to the fixation of both ingredient carriers and/or cooling strands on the stabilizing element, the ingredient carrier and/or cooling strand are coupled to each other and yet are at a fixed distance to each other.

Moreover, the at least two ingredient carriers and/or cooling strands can also be connected to each other through a number of spaced apart stabilizing elements.

Thereby it is possible that each individual stabilizing element is formed differently. Thus, the stabilizing elements can for example be formed in such a way that each individual stabilizing element stabilizes the ingredient carrier and/or cooling strand over another wind direction. Furthermore, the individual stabilizing elements can also be formed in such a way that they can perform additional tasks, such as storing liquid.

In another advantageous embodiment of the supply system, the stabilizing element is led at least in or on the at least one vertical carrier. For this purpose, the at least one vertical carrier can comprise at least one vertical guide rail, in which the stabilizing element can be led and held. By leading and holding the stabilizing element on the vertical carrier, the wind resistance of the supply system can be further increased.

It is preferred if the at least one ingredient carrier and/or cooling strand comprises or carries at least one filter material and/or at least one material comprising pores and/or at least one catalyst material and/or one hygroscopic and/or moisture retentive or moisture absorbing material and/or cold and/or heat retaining material and/or at least a nutrient and/or a reactive and/or adhesive surface. Thereby, the ingredient carrier and/or cooling strand can completely consist of one or several of these materials or can comprise it (them) only partially, for example on its surface or on parts of its surface.

The ingredient carrier and/or cooling strand can for example be chosen in such a way that it is capable of filtering or neutralizing pollutants from a surrounding medium. In an embodiment of the supply and/or cooling system according to the invention, various ingredients can be provided in the spaced apart operating positions, whereby a multi functionality of the ingredient carrier is achieved.

It is especially preferred if seeds and/or plants are provided in the operating positions of the at least one ingredient carrier. In addition to the seeds and/or plants, it is hereby advisable to respectively provide at least one substrate on the operating positions of the ingredient carrier, in which the seeds and/or plants can develop themselves. By attaching or inserting seeds or plants on or into the at least one ingredient carrier, the supply system can for example be used for greening urban areas. This contributes both to the air improvement and embellishment of the urban areas.

Since, according to the invention, a multitude of ingredient carriers can be suspended side by side on the supply tube or the supply channel, a "hanging garden" can be created by this embodiment, which is especially suitable for embellishing house fronts and the like.

By applying the seeds and the plants on or in the spaced apart operating positions of the at least one ingredient carrier, the plants can ideally develop without respectively with mutual influence adjustable by their distance in the ingredient carrier, whereby crippled or stunted growth can be prevented. Furthermore, the supply of the seeds and the plants through the liquid contributes to ideal growth conditions. Hereby, the liquid can for example be water and/or fertilizer. The liquids can be supplied to the ingredient carrier alternately or simultaneously, in intervals or continuously. Preferably the type and amount of liquid is chosen and customized according to the individual conditions of the used seeds and/or plants.

By stretching the ingredient carrier formed as a rope or hose, the seeds or the plants can either be directly brought into the ingredient carrier or else can be provided by installing seed or plant pockets, cloths or belts on or around the ingredient carrier. In this regard, the seed or plant pocket, cloths or belts can also be fixed on the ingredient carrier by means of an additional fastening element, for example in form of a clip.

Besides the seeds or the plants, the ingredient carrier can also comprise a substrate through which the root development of the plants can be ideally supported. As a substrate, for example plant soil or fleece can be used.

Especially preferred, the supply and/or cooling system covers at least one building facade and/or at least one building roof and/or is fixed on a ceiling or a ceiling girder. Due to the easy and individually designable structural design of the supply and/or cooling system, it can be provided on the most diverse locations.

Thus, the supply and/or cooling system, which is only formed of the holding module, can simply be fixed on a ceiling or a ceiling girder. Hereby, the ceiling-fixed supply and/or cooling system can either be used as a room partition or can be provided directly on the wall for decorative design. Considering the limited carrying capacity of the ceiling or the ceiling girder, it can hereby be advantageous, to do without the vertical carriers, wherein they can also be used for a ceiling attachment for whatever reasons.

The supply and/or cooling system according to the invention can be modified in size depending on existing circumstances, if a winding device for at least partially winding up the at least one strand-shaped ingredient carrier and/or cooling strand is provided on an upper and/or a lower end of the at least one ingredient carrier and/or cooling strand. The winding device can for example comprise a horizontal winding roll, onto which the at least one ingredient carrier and/or cooling strand is wound respectively from which the at least one ingredient carrier and/or cooling strand is unwound. In general, it is however also possible to provide the winding device on at least one side of the supply and/or cooling system. The winding device can for example be integrated in or on a frame or a holding module of the supply and/or cooling system. It can be operated automatically or manually.

In another embodiment of the present invention, the supply and/or cooling system comprises at least one wind sensor or flow sensor. If an increased wind speed is measured by the wind sensor, the at least one ingredient carrier and/or cooling strand can for example be fixed or wound up in order to be able to guarantee the safety and/or stability of the supply and/or cooling system even at high wind speeds.

The at least one ingredient carrier and/or cooling strand can also be supplied with liquid from below, if the at least one ingredient carrier and/or cooling strand according to an embodiment of the invention is/are suspended into or in a watering device of the supply and/or cooling system. For this purpose, the liquid can for example be sprayed or fogged from below onto the at least one ingredient carrier and/or cooling strand through at least one nozzle and/or by using fogging technique. The watering device can for example be a gutter filled or fillable with liquid provided below the at least one ingredient carrier and/or cooling strand, in which the at least one ingredient carrier and/or cooling strand can dip into.

It is especially advantageous if the at least one ingredient carrier and/or cooling strand is/are formed of at least one biocidal textile and/or at least one biostatic textile and/or contains at least one biostatic textile fiber material. Thus, an unwanted growth of algae and/or plants and/or bacteria on the at least one ingredient carrier and/or cooling strand can be prevented or at least contained.

An advantageous producibility of the supply and/or cooling system according to the invention is given, when the at least one ingredient carrier and/or cooling strand is/are formed of at least one leno fabric and/or is/are integrated in a leno fabric. Leno fabrics have the advantage that they are interwoven in x and y direction and are stiff along these axes, that is they are not or barely stretchable and can be stretched transversely to these axes. With such textiles, the ingredients can thus for example be one the one hand easily worked into the ingredient carrier while on the other hand the ingredients are held safely in such an ingredient carrier. The leno structure of the leno fabric prevents the structure of the ingredient carrier and/or cooling strand to wear out and retains the same structural characteristics under wind load, whereby process and failure predictions can be derived.

In order to be able to appropriately install the supply and/or cooling system on a building facade, it is preferably composed of the holding module and the two vertical carriers, however, it can also be formed differently. The supply and/or cooling system can thereby either stretch across the entire building facade and/or the entire building roof or cover it/them only partially.

In another variant, the supply and/or cooling system is freestanding, wherein the supply and/or cooling system is directly fixed or fixable on a floor or is fixed or fixable on the floor by means of a substructure and/or is moveable along the floor by means of the substructure. The substructure can hereby be a simple socket or a pedestal. However, said substructure can also be formed in shelf or cupboard-like fashion, wherein the shelf or the cupboard can comprise rollers for moving. Thus, the freestanding moveable embodiment of the supply and/or cooling system can for example be used as a flexible room partition.

Moreover, the supply and/or cooling system can also be provided on a wall, a ceiling and/or a floor of a clarification tank. Where it can contribute to the cleaning of the wastewater by using suitable ingredients.

BRIEF DESCRIPTION OF THE SEVERAL VIEWS OF THE DRAWING

Preferred embodiments of the present invention, their structure, function and advantages are explained in more detail by the following figures, wherein FIG. 1 schematically shows a possible embodiment of a supply and/or cooling system according to the invention in a frontal view.

The FIGS. 3a and 3b schematically show fixing variants of an ingredient carrier and/or cooling strand on a stabilizing element of a supply and/or cooling system according to the invention.

DESCRIPTION OF THE INVENTION

Figure 1:
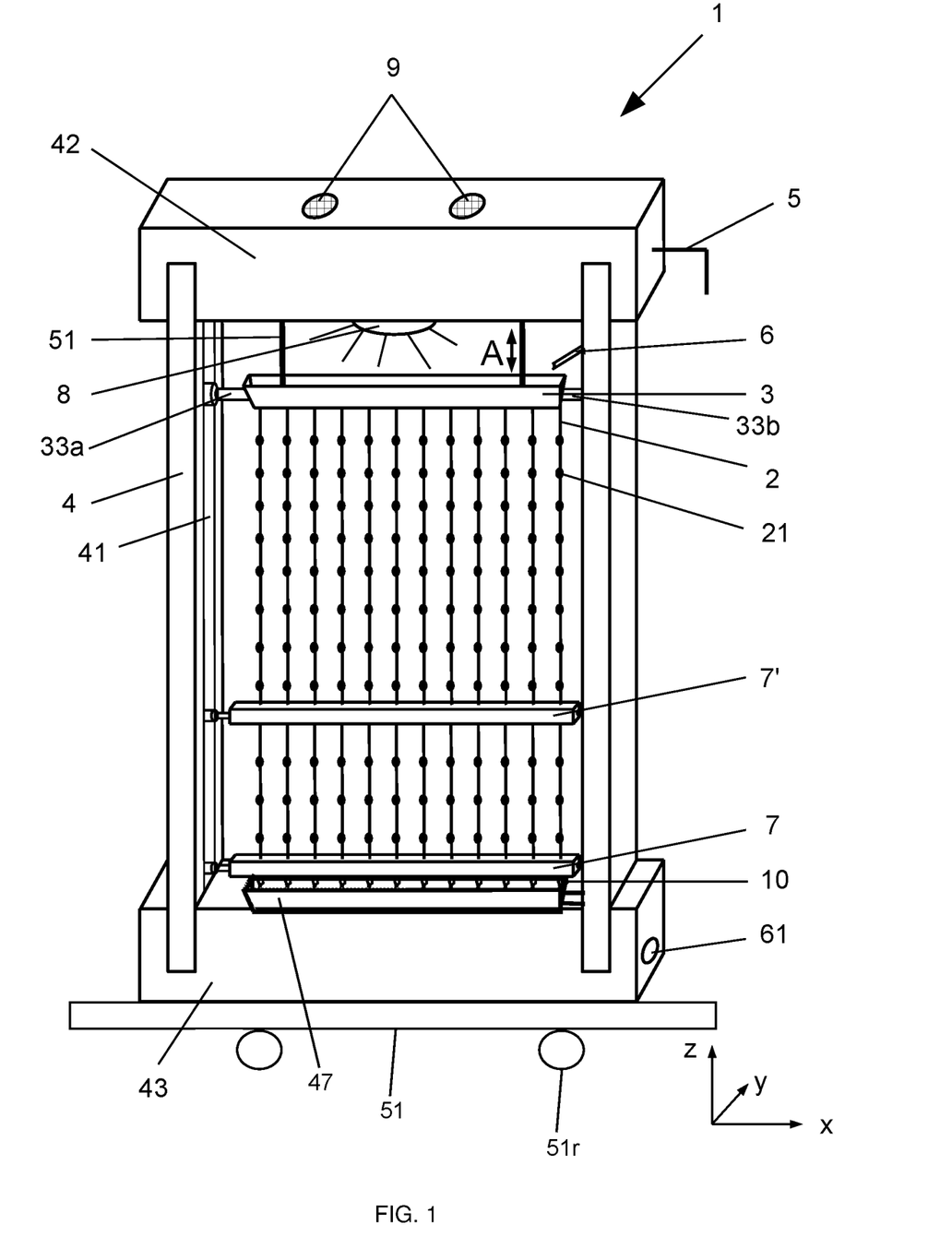

FIG. 1 schematically shows a possible embodiment of a supply and/or cooling system 1 according to the invention in a frontal view.

In the embodiment shown in FIG. 1, the supply and/or cooling system 1 comprises a supply channel 3 for receiving a liquid 31. In other embodiments of the present invention, a supply tube instead of the supply channel 3 can also be used. In other variants of the invention it is furthermore also possible that the supply and/or cooling system 1 comprises more than one supply channel 3 or more than one supply tube for receiving liquid.

In the embodiment of FIG. 1, the supply channel 3 is held on a holding module 42 of the supply system 1. The holding module 42 is vertically unmovable, however, can be formed horizontally moveable. In the embodiment of FIG. 1, the supply channel 3 is fixed on the holding module 42 by means of a fixing system 51. The fixing system 51 is extendible and comprises a rope winch structure in the example of FIG. 1. The fixing system 51 thus enables a vertical movement of the supply channel 3 fixed thereon.

The at least one ingredient carrier and/or cooling strand 2 can also be supplied with liquid from below, if the at least one ingredient carrier and/or cooling strand 2 according to an embodiment of the invention is/are suspended into or in a watering device 47 of the supply and/or cooling system. For this purpose, the liquid can for example be sprayed or fogged from below onto the at least one ingredient carrier and/or cooling strand 2 through at least one nozzle and/or by using fogging technique. The watering device 47 can for example be a gutter filled or fillable with liquid provided below the at least one ingredient carrier and/or cooling strand 2, in which the at least one ingredient carrier and/or cooling strand 2 can dip into.

In another variant, the supply and/or cooling system 1 is freestanding, wherein the supply and/or cooling system 1 is directly fixed or fixable on a floor or is fixed or fixable on the floor by means of a substructure 51 and/or is moveable along the floor by means of the substructure 51. The substructure 51 can hereby be a simple socket or a pedestal. However, said substructure 51 can also be formed in shelf or cupboard-like fashion, wherein the shelf or the cupboard can comprise rollers 51R for moving. Thus, the freestanding moveable embodiment of the supply and/or cooling system 1 can for example be used as a flexible room partition.

The supply and/or cooling system 1 of FIG. 1 comprises a drive unit 5 for vertically moving the supply channel 3. The drive unit 5 can be a manually operable crank handle or also an automatic drive system.

In the embodiment of the supply system 1 of FIG. 1, the holding module 42 is part of a frame construction of the supply and/or cooling system 1, which is formed by a socket 43, two vertically aligned carriers 4 fixed on the socket 43 and serving as a stand and a holding module 42 provided on the upper ends of the vertical carriers 4.

Further embodiments of the supply and/or cooling system 1 can also comprise only one, more than two or no vertical carrier 4 at all. Only one carrier 4 can for example be provided centrally of the supply and/or cooling system 1, similar to a tripod, preferably behind the ingredient carriers 2 and/or cooling strands described in more detail below provided on the supply and/or cooling system 1. In other variants of the present invention, the vertical carrier(s) 4 can moreover be formed in shape of one or several walls, one or several tubes, one or several trees or one or several bridge piers. In other embodiments of the present invention, it also can be done without the socket 43 or it can be formed as a fixed or moveable cupboard, as a fixed or moveable shelf or as a pedestal.

In the embodiment of FIG. 1, the vertical carriers 4 stretch on both sides of the supply channel 3. They are spaced apart to each other in longitudinal alignment x of the supply channel 3 and are respectively connected to an end portion 33a, 33b of the supply channel 3 in the example of FIG. 1.

The supply channel 3 is held and led over its end portions 33a, 33b of guides 41 provided on the carriers 4 or within the carriers 4. Along the guides 41, the supply channel 3 can be moved upwards and downwards, wherein it constantly remains in a horizontal alignment (longitudinal alignment x) in the shown embodiment.

Furthermore, several strand-shaped ingredient carriers 2 spaced apart from each other in the longitudinal alignment x of the supply channel 3 are suspended on the supply channel 3. In other embodiments of the present invention, only one ingredient carrier 2 and/or one or several cooling strands can be suspended on the supply channel 3 or a supply tube, wherein the cooling strands can comprise the same structure, be formed from the same materials, be provided on the same positions, be fixed similarly and be connected in the same way to other components of the supply and/or cooling system 1 as the ingredient carriers 2. The ingredient carriers 2 comprise spaced apart operating positions 21.

The ingredient carriers 2 and/or cooling strands can be formed in shape of bands, cords, ropes, strings, lanyards and/or chains. They can respectively be made of one piece or be put together to one strand by individual strand-shaped components. They can furthermore consist of any imaginable materials.

In the example shown in FIG. 1, the ingredient carriers 2 are formed of stretchable hose material, wherein the respectively spaced apart operating positions 21 are formed by locally stretching the hose material and inserting an ingredient in the stretched areas. The ingredient provided on the operating positions 21 in the supply and/or cooling system 1 of FIG. 1 specifically consists each of a planting substrate such as soil in which seeds or at least one plant is/are inserted, respectively. In order to achieve a good symmetry of the arrangement, the operating positions 21 with the ingredient carriers 2 are respectively provided at the same distance to each other in the example of FIG. 1. With ingredient carriers 2 suspended directly next to each other, it can also be recommendable to provide the operating positions 21 evenly offset to one another.

In other embodiments of the present invention, other ingredients can also be provided on the operating positions 21. Furthermore, the ingredients do not have to be provided spaced apart from each other on the ingredient carrier(s) 2, but can be fixed or inserted on or in the material of the ingredient carrier 2 or can be formed by the material of the ingredient carrier 2 itself.

Thus, in other embodiments of the supply and/or cooling system 1 according to the invention, the ingredient carrier(s) 2 and/or cooling strands can be formed of a catalyst material and/or a filter material.

On a freely suspended lower end of the ingredient carriers 2, a stabilizing element 7 for weighing down, fixing and connecting the ingredient carriers 2 and/or cooling strands with each other is provided in the supply and/or cooling system 1 of FIG. 1. In the embodiment of FIG. 1, the stabilizing element 7 is formed by a rod extending horizontally in the longitudinal alignment x of the supply and/or cooling system 1, but could also be formed by a tube or a longitudinally extending profile.

Figure 3A:
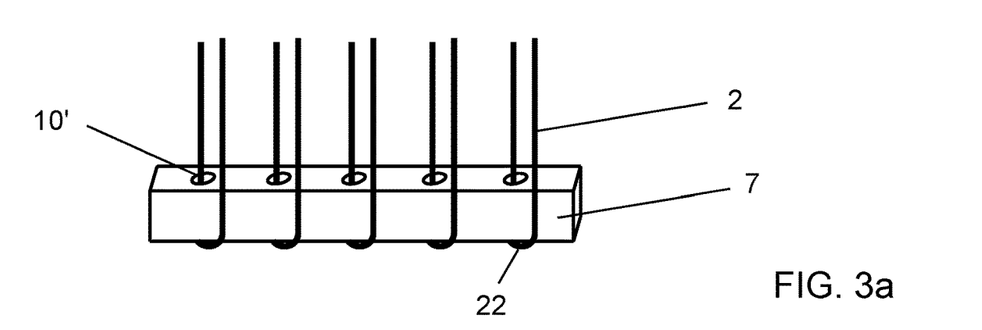

In the embodiment shown in FIG. 1, the stabilizing element 7 comprises spaced apart openings, for example shown in more detail in FIG. 3a, through which the ingredient carriers 2 and/or cooling strands are led. Thereby, the stabilizing element 7 is held below the stabilizing element 7 by knots 10 provided on the ends of the ingredient carriers 2 and/or cooling strands. However, the stabilizing element can also be held on the ingredient carriers 2 and/or cooling strands by means of hooks, a clamping device or thickenings on the ingredient carriers 2 and/or cooling strands.

In the embodiment of FIG. 1, a further stabilizing element 7' is moreover provided between the supply channel 2 and the stabilizing element 7 on the ingredient carriers 2 and/or cooling strands. The further stabilizing element 7' primarily serves the purpose of absorbing air currents which affect the length of the ingredient carriers 2 and/or cooling strands from the outside, thus stabilizing the entire arrangement of the supply and/or cooling system 1. Additionally to the stabilizing element 7 provided on the end, the ingredient carriers 2 and/or cooling strands are connected with each other in a central area of their length and are fixed in their position and their distance to each other by the stabilizing element 7'. Thereby, the freedom of movement of the ingredient carriers 2 is restricted so that for example a tangling of the ingredient carriers 2 and/or cooling strands can be prevented.

The stabilizing elements 7, 7' can comprise a round, oval or polygonal cross section or only a profile form such as a C or V form. Moreover, the stabilizing element 7, 7' does not necessarily have to interconnect the individual ingredient carriers 2 and/or cooling strands, but can be formed in such a way that a separate stabilizing element 7 is provided on each individual ingredient carrier 2. For this, the stabilizing element 7, 7' can also be formed as a ball, ring, cuboid, cylinder, pyramid or any other form, wherein the stabilizing element 7, 7' preferably comprises a drill for leading through the ingredient carrier 2 and/or cooling strand or a holding element, on which the ingredient carrier 2 and/or cooling strand can be mounted or otherwise fixed.

Depending on the length of the ingredient carriers 2 and/or cooling strands, further stabilizing elements 7' can be arranged next to the stabilizing elements 7, 7' over the length of the ingredient carriers 2 and/or cooling strands and be fixed on them.

The supply channel 3 (or in other embodiments of the invention, the supply tube) is coupled to a liquid supply device 6. The ingredient carriers 2 and/or cooling strands are supplied with a liquid 31 such as water or a nutrient solution via the liquid supply device 6 and the supply channel 3 (or the supply tube) coupled to it. For this purpose, liquid discharge openings 32 are provided on the positions in the channel floor of the supply channel 3, on which the ingredient carriers 2 and/or cooling strands are fixed on the supply channel 3. Through the liquid discharge openings 32, the liquid 31 discharged into the supply channel 3 via the liquid supply device 6, can flow or drip onto the ingredient carriers 2 and/or cooling strands.

The liquid supply device 6 can comprise at least one liquid supply line, for example in form of a tube or hose, which, as schematically shown in FIG. 1, leads to the supply channel 3 and for example fills it from the top or sideways. As in the example of FIG. 1, the liquid supply line can run along on or within one or both vertical carriers 4 from bottom to top to the supply channel 3.

On the socket 43 on the lower end of one of the vertical carriers 4, a connection point 61 is provided in the supply and/or cooling system 1 of FIG. 1, on which the liquid supply line can for example be coupled to a not depicted liquid supply container or a water pipe. Depending on where the liquid supply container or the water pipe is provided and how the liquid supply line(s) is/are laid on the supply and/or cooling system 1, the connection point 61 can be placed on any other position of the supply and/or cooling system 1.

In the embodiment shown in FIG. 1, an illuminating device 8 is provided on the holding module 42, on which the supply channel 3 with the ingredient carriers 3 and/or cooling strands is provided. The only schematically depicted illuminating device 8 is aligned or alignable in such a way that the ingredient carriers 2 and/or cooling strands, especially plants growing on the ingredient carriers 2, can be illuminated by the rays radiating from the illuminating device 8.

In the shown embodiment, the supply and/or cooling system 1 furthermore comprises a gas supply and/or gas suction system 9. With the gas supply and/or gas suction system 9, a regulated fresh air supply to and/or used air discharge from the ingredient carriers 2 and/or cooling strands can be realized. The gas supply and/or gas suction system 9 can for example also comprise at least one blower for cleaning the ingredient carriers 2 and/or cooling strands and/or separating the supply and/or cooling system 1 by means of blowing off.

In the variant shown in FIG. 1, the gas supply and/or gas suction system 9 comprises two gas supply and gas suction openings fixed on the holding module 42, however, it can also comprise only one or more than two gas supply and/or gas suction openings in other embodiments, which can comprise any diameter and can be coupled to differing gas supply and/or exhaust air systems. Furthermore, there is also the possibility to fix the gas supply and/or gas suction openings in the socket 43 or on the vertical carriers 4.

Figure 2:
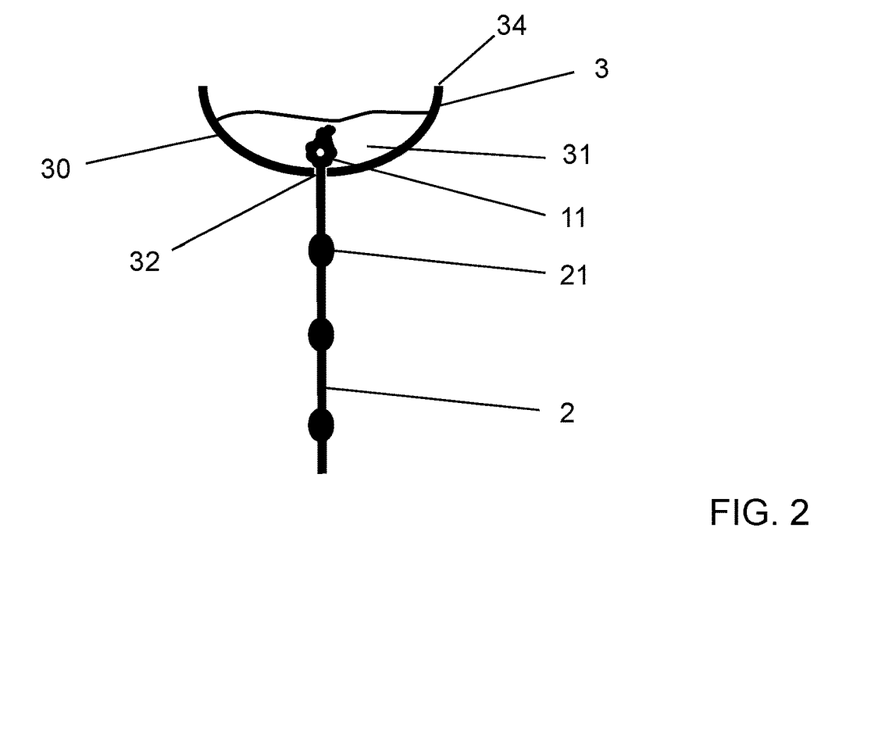
FIG. 2 schematically shows a variant of an ingredient carrier and/or cooling strand fixed on a supply channel of a supply and/or cooling system according to the invention in a side view.

FIG. 2 schematically shows a variant of an ingredient carrier 2 and/or cooling strand fixed on a supply channel 3 of a supply and/or cooling system according to the invention, such as the supply and/or cooling system 1 from FIG. 1, in a side view. Thereby, the same reference signs as in FIG. 1 correspond to the same components, which is why it is being referred to the above description of the components.

The ingredient carrier 2 and/or cooling strand depicted in FIG. 2 is led through a liquid discharge opening 32 provided in a channel floor area 30 of the supply channel 3 and is held on the supply channel 3 from above by a knot 11 on the ingredient carrier 2 and/or cooling strand.

If the supply channel 3 is at least partially filled with the liquid 31, the ingredient carrier 2 and/or cooling strand is also in contact with the liquid 31, whereby the liquid can spread alongside the ingredient carrier 2 and/or cooling strand, especially up to its operating positions 21.

In another variant of the present invention, the ingredient carrier 2 and/or cooling strand can also be brought into the supply channel 3 over an edge of the channel 34 and be held there. Furthermore, the ingredient carrier 2 and/or cooling strand can be held on the outside of the supply channel 3 by means of hooks or eyelets. It is also possible to fix the ingredient carrier 2 and/or cooling strand indirectly on the supply channel 3 by means of an additional mounting, such as a rod, which is attached to the supply channel 3 and holds the ingredient carrier 2 and/or cooling strand.

In the embodiment depicted in FIG. 2, the supply channel 3 comprises a semicircular cross section; however, in other variants it can also have a triangular, rectangular or oval cross section. As mentioned above, a supply tube closed in its circumference can also be used instead of the open-top supply channel 3.

Figure 3B:
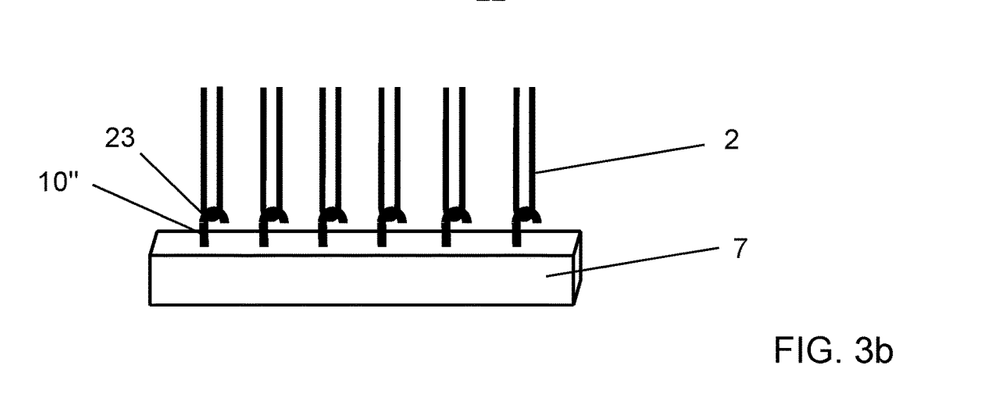

The FIGS. 3a and 3b schematically show fixing variants of an ingredient carrier 2 and/or cooling strand of a supply and/or cooling system according to the invention, such as the supply and/or cooling system 1 of FIG. 1, on a stabilizing element 7, wherein the same reference signs as in the FIGS. 1 and 2 correspond to the same components. It is hereby referred to the above explanations concerning these components.

In FIG. 3a, the freely suspended ends of the ingredient carriers 2 and/or cooling strands are led through openings 10' provided in the stabilizing element 7 and are led back over the sides of the stabilizing element 7 back towards the supply channel 3 or a supply tube, on which these ends can be fixed so that loops 22 are formed around the stabilizing element 7, through which the stabilizing element 7 is held on the ingredient carriers 2 and/or cooling strands.

In the embodiment of FIG. 3b, hooks 10" are provided on the stabilizing element 7, on which the stabilizing element 7 is mounted in the loops 22 formed through the ingredient carriers 2 and/or cooling strands. In case of ingredient carriers 2 formed thicker or ingredient carriers 2 and/or cooling strands, which are formed as a chain, it is also possible to lead the hook 10" directly through the material of the ingredient carrier 2 and/or cooling strand or through a chain ring of the ingredient carrier 2 and/or cooling strand, without the need to form loops.

Another possibility to connect the stabilizing element 7 with the at least one ingredient carrier 2 and/or cooling strand can for example be seen in FIG. 1. Here, the ingredient carriers 2 and/or cooling strands led through the openings 10' of the stabilizing element 7 comprise a knot 10 or another thickening or a separately attached element on their ends, which has a larger diameter than the opening 10' of the stabilizing element 7. Such a formation is also suitable for fixing the further stabilizing element 7' on the ingredient carriers 2 and/or cooling strands.

With a corresponding formation of the ingredient carrier 2 as well as the stabilizing element 7, the stabilizing element 7,7' and the ingredient carrier 2 can, if necessary, also be connected to each other by welding, soldering, gluing or by means of detachable adhesive strips. The stabilizing element 7, 7' can also be formed as a cast body, for example from a synthetic resin, in rod shape, into which the at least one ingredient carrier 2 and/or cooling strand is/are moulded.

Figure 4:
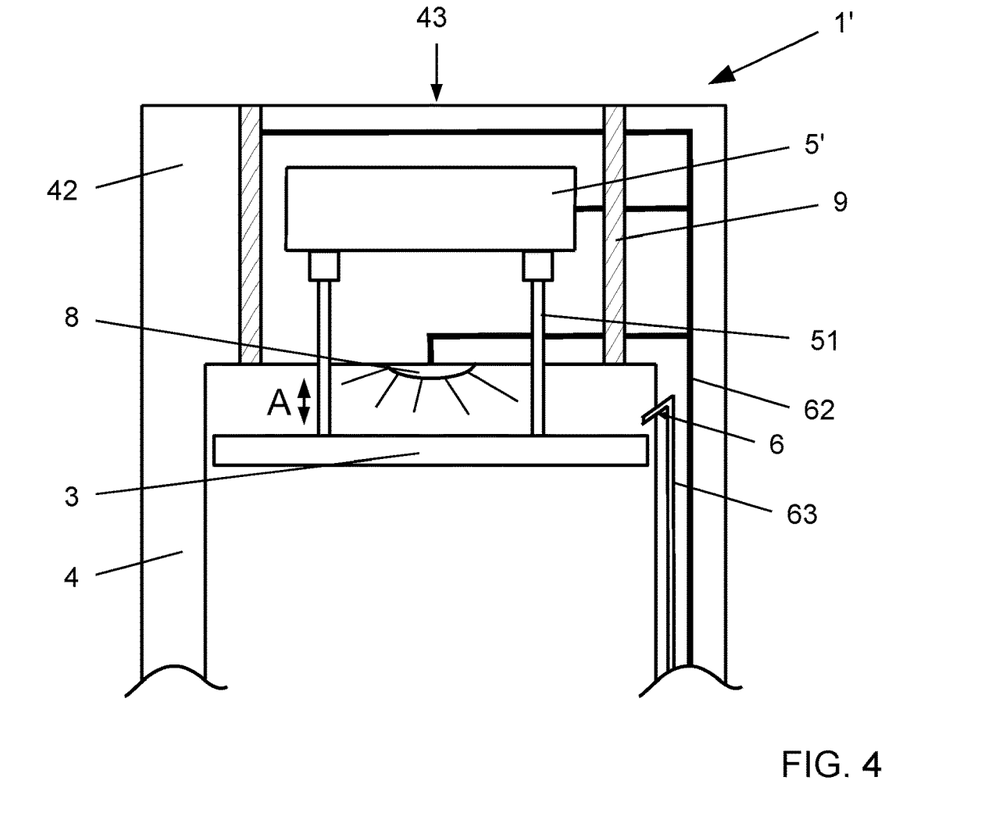
FIG. 4 schematically shows an embodiment of the supply and/or cooling system according to the invention in a cut frontal view.

FIG. 4 schematically shows a further embodiment of a supply and/or cooling system 1' according to the invention in a cut frontal view. Thereby the reference signs already used above refer to the same components, on whose preceding description is hereby being referred to.

FIG. 4 shows media lines laid in the vertical carriers 4 and the holding module 42. One of these media lines is the liquid supply line 63 placed in the vertical carrier 4, which is part of the above explained fluid supply device 6 and which discharges the liquid 31 into the supply channel 3. In other, not depicted embodiments of the supply and/or cooling system 1, 1' according to the invention, the liquid supply line 63 can also be led above or behind the supply and/or cooling system 1, 1'.

At least one more media line provided in the vertical carrier 4 and the holding module 42 is an electric line 62. By the electric line 62, for example the illuminating device 8, the gas supply and/or gas suction device 9 and/or the drive unit 5', such as at least one electric motor and/or a control of electric components of the supply and/or cooling system 1', can be supplied with energy. Depending on the components fixed on or in the supply and/or cooling system 1 and their arrangement, the course of the media lines 62, 63 as well as their presence can vary. When using a pneumatic or hydraulic drive unit 5, a hydraulic or pneumatic line is furthermore provided on the supply and/or cooling system 1, 1'.

The media lines 62, 63 preferably run along or through the vertical carrier(s) 3 and/or the holding module 42 and/or the socket 43.

The supply and/or cooling system 1' comprises an electric drive unit 5', which is coupled to the vertically moveable supply channel 3. For this purpose, the supply channel 3 is fixed to the drive unit 5' by means of ropes, tapes or chains 51 that are controllably extendible from the drive unit 5'. The drive unit 5' can be placed inside the holding module 42, but can also be provided as a separate component on the supply system 1'. As shown in the example of FIG. 4, it is advantageous for a stable suspension of the supply channel 3 if it is suspended on at least two extendible ropes, tapes or chains connected to the drive unit 5'.

As was already mentioned above, it is, however, also possible in other embodiments to hold the supply channel 3 or the supply tube above the guides 41 provided on the vertical carriers 4 and to move them vertically. In this case, the drive unit 5, 5' is preferably provided on at least one of the vertical carriers.

At least one vertical guide rail preferably attached to the holding module 42 can also be provided, which stretches across the entire height of the supply and/or cooling system 1,1' and on which the supply channel 3 or the supply tube can be held or guided.

Figure 5:
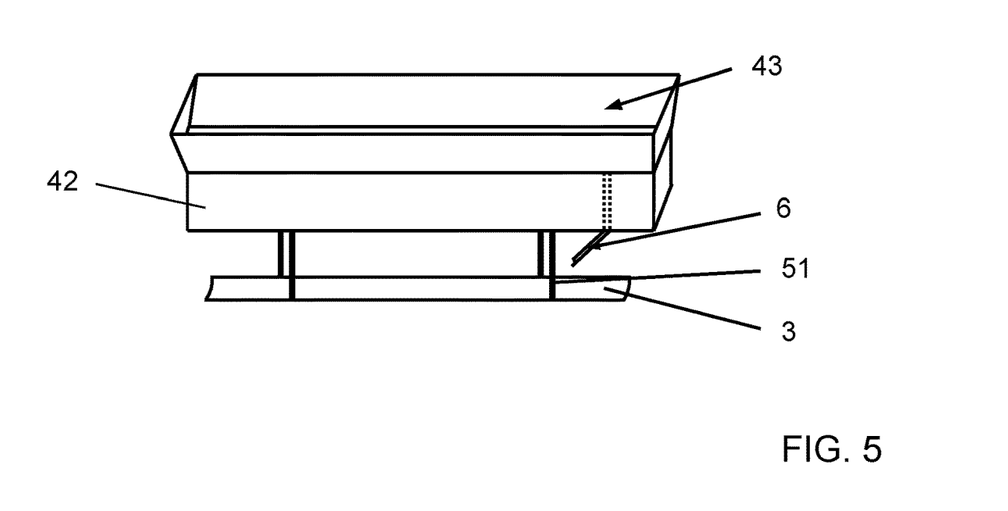
FIG. 5 schematically shows an embodiment of a holding module of a supply and/or cooling system according to the invention in a frontal view.

FIG. 5 schematically shows a variation of a holding module 42 of an embodiment of the supply and/or cooling system 1,1' according to the invention in a frontal view, wherein here also already used reference signs refer to the same components as in the above described figures.

The holding module 42 of FIG. 5 is especially suitable for an embodiment of the supply and/or cooling system 1, 1' according to the invention, which can be set up outside. For this purpose, an open-top collecting tank 43 for rainfall is fixed upon the holding module 42. The collecting tank 43 is preferably at least partially open to the top so that rainfall can be taken in by the collecting tank 43. The rainfall can then for example be discharged to the above described fluid supply device 6 and be supplied to the supply channel 3, through which in turn the at least one ingredient carrier 2 and/or cooling strand can be watered.

Especially if the ingredient carrier 2 is provided with seeds and/or plants, a cost-effective watering of the seeds and/or the plants can thus be realized.

In the embodiment shown in FIG. 5, the collecting tank 43 has nearly the same dimensions as the holding module 42, however, it can also be formed larger or smaller than the holding module 42.

Moreover, there is also the possibility to use a roof surface adjoining the supply and/or cooling system 1, 1' for collecting rainfall so that the rainfall additionally collected by the roof surface is simply passed on to the collecting tank 43. In order to be able to take in and store large amounts of rainfall, an additional buffer can be provided in which unused rainfall can be intermediately stored and/or through which excessive rainfall can be discharged.

Figure 6:
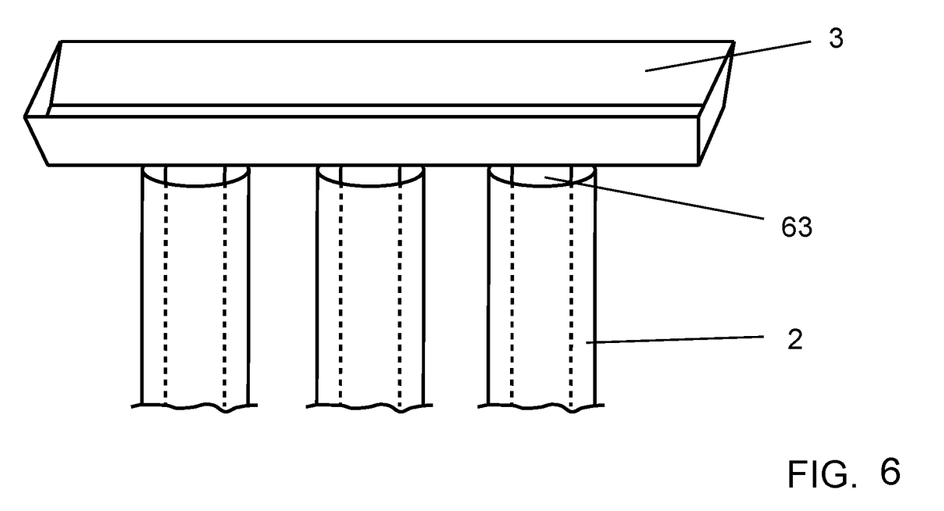
FIG. 6 schematically shows an example of an embodiment of an ingredient carrier and/or cooling strand fixed on a supply channel of a supply and/or cooling system according to the invention in a frontal view.

FIG. 6 schematically shows an embodiment of an ingredient carrier 2 fixed on a supply channel 3 of an embodiment of a supply and/or cooling system 1, 1' according to the invention in a frontal view. Here already used reference signs also refer to the same components as in the above described figures.

In the embodiment depicted in FIG. 6, liquid supply lines 63 are led through the ingredient carriers 2 so that they can be ideally supplied with the liquid 31. For this, it is especially advantageous if the ingredient carrier 2 and/or cooling strand is formed as a hose so that the liquid supply line 63 can simply be slid into the ingredient carrier or cooling strand. The liquid supply line 63 preferably consists of a hose comprising pores, wherein the liquid can reach the ingredient carrier 2 and/or cooling strand and/or the operating positions of the ingredient carrier 2 through the pores.

The ingredient carrier 2 and/or cooling strand comprising the liquid supply line 63, can be pressed into the liquid discharge opening 32, for example schematically shown in FIG. 2, and be held there. On the liquid discharge opening 32 at least one fixing element, such as a clamp or a hook, for holding the ingredient carrier 2 and/or cooling strand can also be provided on the liquid discharge opening 32.

The ingredient carrier 2 and/or cooling strand does not necessarily have to be suspended directly in or below the liquid discharge opening 32, but can be provided at a distance to it, as long as it is made sure that the liquid 31 can reach the ingredient carrier 2 and/or cooling strand via the liquid discharge opening 32. This can for example be realized by an inclined position of the supply channel 3 or the supply tube or by suitable channels.

The liquid supply device 6 can be formed and/or used for drop moistening, spray moistening as well as other moistening options for moistening the at least one ingredient carrier 2 and/or cooling strand.

The at least one ingredient carrier 2 and/or cooling strand or other installations of the supply and/or cooling system 1, 1' can be formed and/or fixed in such a way that they can be easily separated from further components of the supply and/or cooling system 1, 1', thus are easily exchangeable.

The at least one ingredient carrier 2 and/or cooling strand and/or other installations of the supply and/or cooling system 1, 1' can be wound up, pushed into one another and/or pushed together by means of manipulation devices and/or controls.

Figure 7:
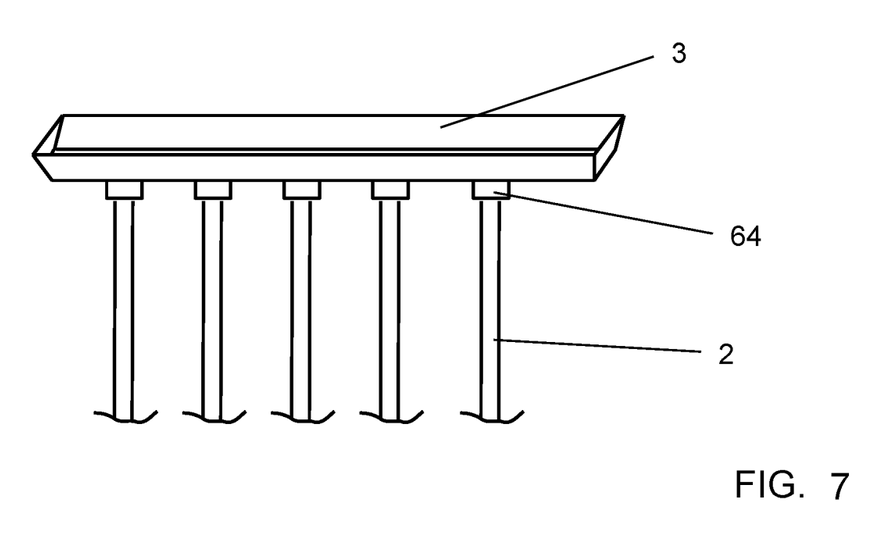
FIG. 7 schematically shows another variant of an ingredient carrier and/or cooling strand fixed on a supply channel of a supply and/or cooling system according to the invention in a frontal view.

FIG. 7 schematically shows another variant of an ingredient carrier 2 and/or cooling strand fixed on a supply channel 3 in an embodiment of the supply and/or cooling system 1, 1' according to the invention in a frontal view, wherein the same reference signs also refer to the same components as in the preceding figures and to whose preceding description is hereby being referred to.

On the liquid discharge openings 32 of the supply channel 3, for example seen in FIG. 2, valves 64 are provided in the example of FIG. 7, with which the discharge of the liquid 31 to the ingredient carriers 2 and/or cooling strands is controlled respectively regulated. With the valves 64, for example the throughput volume and/or throughput time can be regulated, whereby the liquid supply can be ideally adjusted to the requirements of the respective ingredient of the ingredient carrier 2.

Alternatively or additionally to the valve 64, further embodiments of the present invention can comprise a nozzle on the liquid discharge opening 32, whereby the liquid supply pressure can be controlled. Accordingly, large amounts of liquid can be discharged to the ingredient carrier 2 and/or cooling strands within a short amount of time.

Contrary to the embodiment shown in FIG. 7, the ingredient carrier 2 and/or cooling strand does not have to be fixed directly on the liquid discharge opening 32 when using a valve 64 or a nozzle, but can also be provided spaced apart from it. In that case, a small tube or hose, a sprinkler, a nozzle or a vaporizer can for example be attached to the valve 64 fixed on the liquid discharge opening 32 and thus the liquid 31 can be transported to the respective ingredient carrier 2 and/or cooling strand.

The invention claimed is:

1. A supply and/or cooling system, comprising:
   at least one supply device selected from the group consisting of a liquid supply device and a gas supply and/or gas suction system;
   at least one supply element, selected from the group consisting of a supply tube and a supply channel, for receiving a liquid and/or a gas, said supply element being coupled to said liquid supply device and/or said gas supply and/or gas suction system and having a casing region or a tube or channel base with at least one liquid and/or gas discharge opening formed therein;
   a plurality of strand-shaped ingredient carriers and/or cooling strands being suspended spaced apart from each other on said supply tube or said supply channel in a longitudinal alignment of said supply tube or said supply channel and/or said supply tube or said supply channel coupled to said gas supply and/or gas suction system is suspended below at least one of said strand-shaped ingredient carriers and/or said cooling strands and wherein said at least one strand-shaped ingredient carrier contains and/or carries at least one ingredient, and said at least strand-shaped one ingredient carrier and/or said at least one cooling strand can be supplied with the liquid and/or the gas over said liquid and/or gas discharge opening; and
   said supply tube or said supply channel being vertically moveable;
   a vertically immovable holding module;
   an extendible fixing system, said supply tube or said supply channel is fixed on said vertically immoveable holding module by means of said extendible fixing system;
   at least one vertical carrier on which said supply tube or said supply channel is led; and
   at least one stabilizing element disposed at a vertical distance from said supply tube or said supply channel, and on said stabilizing element said at least one strand-shaped ingredient carrier and/or said at least one cooling strand is fixed and through which said at least one strand-shaped ingredient carrier and/or said at least one cooling strand is led through.

2. The supply and/or cooling system according to claim 1, wherein said at least one ingredient is provided on or in spaced apart operating positions of said at least one strand-shaped ingredient carrier.

3. The supply and/or cooling system according to claim 1, further comprising a frame disposed around said at least one strand-shaped ingredient carrier and/or said at least one cooling strand, which is at least partially formed by said vertically immovable holding module and said at least one vertical carrier.

4. The supply and/or cooling system according to claim 1, further comprising two vertical carriers disposed spaced apart from each other on both sides of said supply tube or said supply channel and in the longitudinal alignment of said supply tube or said supply channel.

5. The supply and/or cooling system according to claim 1, wherein said at least one vertical carrier has at least one media line for media guidance.

6. The supply and/or cooling system according to claim 1, further comprising a ventilation system, said at least one gas supply and/or gas suction system and/or said ventilation system is aligned or alignable to said at least one strand-shaped ingredient carrier and/or said at least one cooling strand.

7. The supply and/or cooling system according to claim 1, further comprising at least one electrical illuminating device aligned or alignable to said at least one strand-shaped ingredient carrier and/or said at least one cooling strand.

8. The supply and/or cooling system according to claim 1, wherein said at least one strand-shaped ingredient carrier and/or said at least one cooling strand is fixed in or on and/or below said liquid and/or gas discharge opening of said supply tube or said supply channel.

9. The supply and/or cooling system according to claim 1, wherein said at least one strand-shaped ingredient carrier and/or said at least one cooling strand is at least one of horizontally transportable, moveable, or windable.

10. The supply and/or cooling system according to claim 1, further comprising a liquid supply line connected to said at least one liquid and/or gas discharge opening and is led through said at least one strand-shaped ingredient carrier and/or said at least one cooling strand.

11. The supply and/or cooling system according to claim 1, further comprising at least one adjustable valve and/or an adjustable nozzle disposed on said at least one liquid and/or gas discharge opening.

12. The supply and/or cooling system according to claim 1, wherein at least two of said strand-shaped ingredient carriers and/or said cooling strands are connected to each other by said stabilizing element.

13. The supply and/or cooling system according to claim 1, wherein said stabilizing element is at least led in or on said at least one vertical carrier.

14. The supply and/or cooling system according to claim 1, wherein said at least one strand-shaped ingredient carrier and/or said at least one cooling strand has or carries at least one of filter material, at least one material having pores, at least one catalyst material, a hygroscopic, a moisture retentive or moisture absorbing material, cold and/or heat retaining material, at least one ingredient, or a reactive and/or adhesive surface.

15. The supply and/or cooling system according to claim 1, further comprising at least one of seeds or plants are disposed in operating positions of said at least one strand-shaped ingredient carrier.

16. The supply and/or cooling system according to claim 1, further comprising a winding device for at least partially winding up said at least one strand-shaped ingredient carrier and/or said at least one cooling strand and is provided on an upper and/or a lower end of said at least one strand-shaped ingredient carrier and/or said at least one cooling strand.

17. The supply and/or cooling system according to claim 1, further comprising a watering device, said at least one strand-shaped ingredient carrier and/or said at least one cooling strand hangs into or in said watering device.

18. The supply and/or cooling system according to claim 1, wherein said at least one strand-shaped ingredient carrier and/or said at least one cooling strand is formed from at least one of at least one biocide textile, at least one biostatic textile, or contains at least one biostatic textile fiber material.

19. The supply and/or cooling system according to claim 1, wherein said at least one strand-shaped ingredient carrier and/or said at least one cooling strand is formed from at least one leno fabric and/or is integrated in said leno fabric.

20. The supply and/or cooling system according to claim 1, wherein the supply and/or cooling system is freestanding, wherein the supply and/or cooling system is directly fixed or fixable on a floor or is fixed or fixable on the floor by means of a substructure and/or is moveable along the floor by means of the substructure.

21. The supply and/or cooling system according to claim 1, wherein the supply and/or cooling system is provided on a wall, a ceiling and/or a floor of a clarification tank.

* * * * *